(12) United States Patent
Aungurencei et al.

(10) Patent No.: US 9,667,168 B2
(45) Date of Patent: May 30, 2017

(54) SYSTEM AND METHOD FOR SYNCHRONOUS RECTIFICATION WITH ENHANCED DETECTION OF SMALL CURRENTS

(71) Applicant: Integrated Device Technology, Inc., San Jose, CA (US)

(72) Inventors: Gabriel C. Aungurencei, San Jose, CA (US); Vladimir Vitchev, San Jose, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 5 days.

(21) Appl. No.: 14/710,479

(22) Filed: May 12, 2015

(65) Prior Publication Data

US 2016/0336871 A1 Nov. 17, 2016

(51) Int. Cl.
*H02M 7/155* (2006.01)
*H02M 7/217* (2006.01)
*H02M 7/219* (2006.01)
*H02M 1/00* (2006.01)

(52) U.S. Cl.
CPC ........... *H02M 7/217* (2013.01); *H02M 7/219* (2013.01); *H02M 2001/0009* (2013.01); *H02M 2007/2195* (2013.01)

(58) Field of Classification Search
CPC .................................................. H02M 7/217
USPC ......... 363/81, 82, 84, 88, 89, 123, 125–127; 323/272
See application file for complete search history.

(56) References Cited

U.S. PATENT DOCUMENTS

| | | | | |
|---|---|---|---|---|
| 6,249,111 B1 * | 6/2001 | Nguyen | ............... | H02M 3/1588 323/282 |
| 6,441,598 B1 * | 8/2002 | Ivanov | ................ | H02M 3/1588 323/272 |
| 6,563,293 B2 * | 5/2003 | Marino | ............... | H02M 3/1584 323/272 |
| 6,825,641 B2 * | 11/2004 | Pigott | ................. | H02M 3/1584 323/222 |
| 6,870,747 B2 * | 3/2005 | Bridge | .............. | H02M 3/33592 363/21.06 |
| 7,180,274 B2 * | 2/2007 | Chen | ................... | H02M 3/1588 323/222 |
| 7,952,294 B2 * | 5/2011 | Shteynberg | ........... | H02M 3/155 315/224 |

(Continued)

*Primary Examiner* — Adolf Berhane
*Assistant Examiner* — Nusrat Quddus
(74) *Attorney, Agent, or Firm* — Hayes and Boone LLP (57) ABSTRACT

A system and method of synchronous rectification includes a synchronous rectifier circuit. The synchronous rectifier circuit includes a direct current (DC) load coupled between a DC output node and a ground node, an alternating current (AC) source applying an AC waveform to an AC input node, an upper switch coupled between the DC output node and the AC input node, and a lower switch coupled between the AC input node and the ground node. In a first state, the upper switch is turned on and the lower switch is turned off. In a second state, the upper switch is turned off and the lower switch is turned on. In a third state, the lower switch is operated in an enhanced detection mode. The synchronous rectifier circuit transitions from the second state to the third state when the voltage of the AC input node increases above a threshold voltage.

20 Claims, 5 Drawing Sheets

(56) References Cited

U.S. PATENT DOCUMENTS

| | | | | |
|---|---|---|---|---|
| 8,036,001 B2* | 10/2011 | Choi | .............. | H02M 1/08 |
| | | | | 363/21.02 |
| 8,450,964 B2* | 5/2013 | Petroianu | .............. | H02J 7/35 |
| | | | | 136/291 |
| 8,711,584 B2* | 4/2014 | Zhang | .............. | H02M 1/36 |
| | | | | 363/21.13 |
| 9,001,543 B2* | 4/2015 | Knoedgen | .............. | H02M 7/06 |
| | | | | 363/125 |
| 2010/0165686 A1* | 7/2010 | Matzberger | .............. | H02M 7/219 |
| | | | | 363/127 |
| 2011/0095731 A1* | 4/2011 | Zhao | .............. | H02M 1/4225 |
| | | | | 323/205 |
| 2014/0376272 A1* | 12/2014 | Miao | .............. | H02M 3/33592 |
| | | | | 363/21.02 |
| 2015/0061611 A1* | 3/2015 | Li | .............. | H02M 3/1588 |
| | | | | 323/235 |

\* cited by examiner

SYSTEM AND METHOD FOR SYNCHRONOUS RECTIFICATION WITH ENHANCED DETECTION OF SMALL CURRENTS

TECHNICAL FIELD

The present disclosure relates generally to synchronous rectification and more particularly to synchronous rectification with enhanced detection of small currents.

BACKGROUND

Synchronous rectifiers have widespread applications in electronic systems where the conversion of an alternating current (AC) to a direct current (DC) is desired. For example, chargers for portable electronic devices, such as laptop, handheld, and/or wearable computers, may use synchronous rectification to convert AC mains power into DC power suitable for powering the electronic device and/or for charging a battery associated with the electronic device. Increasingly, electronic devices are equipped to receive power wirelessly using wireless power transfer. Wireless power transfer offers a convenient technique for conveying electrical power without the use of traditional electrical cords. Among other advantages, wireless power transfer reduces safety hazards associated with cords, such as tripping and fire hazards, and improves aesthetics by reducing cord clutter. Still further, wireless power transfer is a low-hassle and cost-effective alternative to wired charging for portable electronics. For example, for portable electronics that are charged daily, wireless power transfer reduces the likelihood of misplacing wired chargers and prevents wear-and-tear associated with repeatedly plugging and unplugging the devices. Among numerous other applications, synchronous rectifiers play an important role in enabling wireless power transfer systems.

Accordingly, it would be desirable to provide improved synchronous rectifiers.

SUMMARY

Consistent with some embodiments, an synchronous rectifier circuit includes a direct current (DC) load coupled between a DC output node and a ground node, an alternating current (AC) source applying an AC waveform to an AC input node, an upper switch coupled between the DC output node and the AC input node, and a lower switch coupled between the AC input node and the ground node. The synchronous rectifier circuit is configured to operate in multiple states, the multiple states including first, second, and third states. In the first state, the upper switch is turned on and the lower switch is turned off. In the second state, the upper switch is turned off and the lower switch is turned on. In the third state, the upper switch is turned off and the lower switch is operated in an enhanced detection mode. The synchronous rectifier circuit transitions from the first state to the second state when a voltage of the AC input node decreases below a first threshold voltage, from the second state to the third state when the voltage of the AC input node increases above a second threshold voltage, and from the third state to the first state when the voltage of the AC input node increases above a third threshold voltage.

Consistent with some embodiments, a control circuit for a synchronous rectifier includes a logic module configured to transmit one or more control signals to operate one or more switches of the synchronous rectifier, a first comparator configured to determine whether a voltage of an AC input node is above or below a turn-on threshold voltage, a second comparator configured to determine whether the voltage of the AC input node is above or below a turn-off threshold voltage, and a logic module configured to detect low-high and high-low transitions of the first and second comparators and transmit one or more control signals to operate one or more switches of the synchronous rectifier. The logic module determines the one or more control signals based on a state function, the state function including first, second, and third states. In the first state, the one or more switches are turned off. In the second state, the one or more switches are turned on. In the third state, the one or more switches are operated in an enhanced detection mode. The state function transitions from the first state to the second state when a high-low transition of the first comparator is detected, from the second state to the third state when a first low-high transition of the second comparator is detected, and from the third state to the first state when a second low-high transition of the second comparator is detected.

Consistent with some embodiments, a method for operating a synchronous rectifier includes detecting when an AC input voltage crosses below a turn-on threshold voltage, turning on one or more switches of the synchronous rectifier when the AC input voltage crosses below the turn-on threshold voltage, detecting when the AC input voltage crosses above a first turn-off threshold voltage, operating the one or more switches in an enhanced detection mode when the AC input voltage crosses above the first turn-off threshold voltage, detecting when the AC input voltage crosses above a second turn-off threshold voltage, and turning off the one or more switches when the AC input voltage crosses above the second turn-off threshold voltage.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Unlike conventional rectifier circuits, synchronous rectifiers use switches instead of (and/or in addition) to diodes in order to rectify an AC waveform and generate a DC output. During typical usage of a synchronous rectifier, the voltage drop across the closed switches is smaller than the voltage drop across a forward-biased diode for a given current level (i.e., the switches have a low 'on' resistance). Thus, synchronous rectifiers may be more energy efficient than diode-based rectifiers. Because the switches of a synchronous rectifier are actively controlled, detection circuitry is used to determine the polarity of the AC waveform at a given time and operate the switches accordingly. For example, detection circuitry may detect a voltage and/or current associated with the AC waveform and determine when the voltage and/or current crosses above and/or below one or more predetermined thresholds. Accurately determining the polarity of the AC waveform and controlling the switches in a timely manner plays a key role in determining the energy efficiency of the synchronous rectifier. However, due to the small resistance of the switches, the voltage drop across the switches for a given current level may be too small to accurately measure. This is especially problematic when the current level is small, such as when determining the point in time when the AC waveform crosses a zero current threshold during a polarity reversal. Thus, it would be desirable to enhance the ability to detect small currents in a synchronous rectification circuit.

Figure 1:
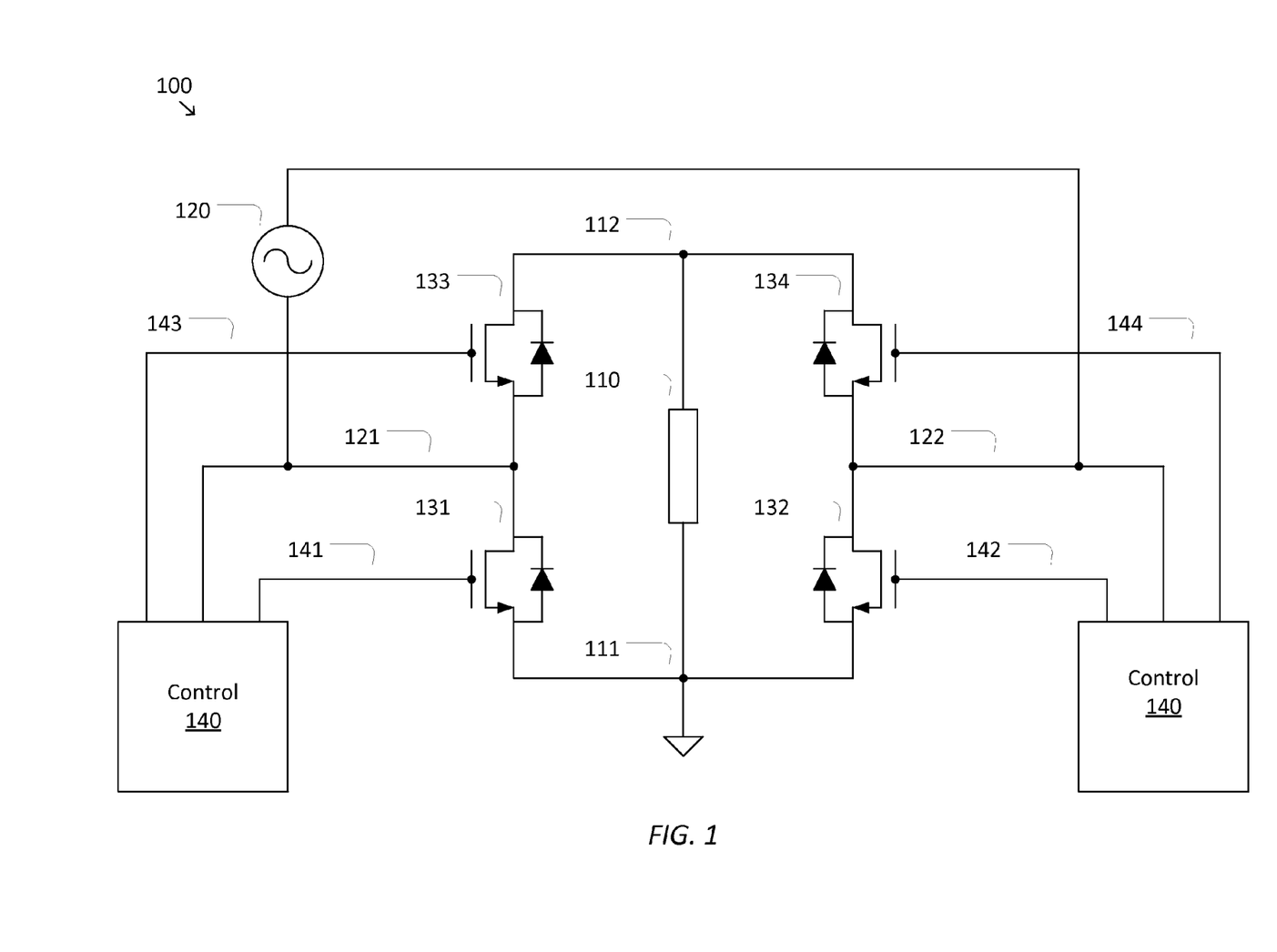
FIG. 1 is a simplified diagram of a synchronous rectifier circuit.

FIG. 1 is a simplified diagram of a synchronous rectifier circuit 100. Synchronous rectifier circuit 100 includes a load 110 coupled between a DC low node 111 (e.g. a ground node pinned to 0 V) and a DC high node 112. Load 110 is configured to receive DC power. Load 110 may include any electronic circuits associated with an electronic device, such as an integrated circuit, actuator, display, battery charger, sensor, transceiver, transducer, and/or the like. Load 110 may further include filtering components such as capacitors, inductors, and/or resistors for smoothing the DC output waveform of synchronous rectifier circuit 110. Synchronous rectifier circuit 100 further includes an AC source 120 coupled between a pair of AC input nodes 121 and 122. AC source 120 may include any source and/or conveyor of AC power such as mains power lines, a generator, a wireless power receiver, an inverter, a transformer, and/or the like. AC source 120 generates an AC waveform between AC input nodes 121 and 122. The AC waveform may include any waveform that alternates polarity. That is, at some times the voltage of AC input node 121 is higher than AC input node 122, and at other times the voltage of AC input node 122 is higher than AC input node 121. The AC waveform may include a sinusoidal waveform, a square waveform, an aperiodic waveform, and/or the like.

AC power from AC source 120 is converted into DC power suitable for powering load 110 using switches 131-134. Switches 131-134 may include field effect transistors (FETs), each FET having a gate, source and drain. The FETs may further be associated with body diodes oriented as depicted in FIG. 1. The body diodes may include intrinsic body diodes of the FETs, and/or may include diodes in parallel with the switches such as Schottky diodes. The FETs may be n-channel FETs (NFETs). The NFETs are turned on (i.e., electrically conductive between source and drain) when their gate voltage is higher than their source voltage by at least a threshold voltage, otherwise, they are turned off (i.e., non-conductive between source and drain). The FETs are each associated with an 'on' resistance, generally determined based on a width of the FETs. In general, a lower 'on' resistance of the FETs (i.e., the resistance between the source and drain of the FETs in the conductive state) increases the energy efficiency of synchronous rectifier circuit 100.

Switches 131-134 are controlled by a control module 140. Control module 140 is coupled to the gates of switches 131-134 through control nodes 141-144. Control module 140 is further coupled to AC input nodes 121 and 122 to determine whether the voltage of AC input node 121 is higher than AC input node 122. Control module 140 operates switches 131-134 in multiple states. In a first state, when the voltage of AC input node 121 is higher than AC input node 122, control module 140 closes (turns on) switches 132 and 133 by applying a high voltage to control nodes 142 and 143 and opens (turns off) switches 131 and 134 by applying a low voltage to control nodes 141 and 144. This configuration permits current to flow from AC input node 121 to AC input node 122 through a loop that includes closed switch 132, load 110, and closed switch 133. The direction of the load current (i.e., the DC current flowing through load 110) is from DC high node 112 to DC low node 111. In a second state, when the voltage of AC input node 122 is higher than AC input node 121, control module 140 closes switches 131 and 134 by applying a high voltage to control nodes 141 and 144 and opens switches 132 and 133 by applying a low voltage to control nodes 142 and 143. This configuration permits current to flow from AC input node 122 to AC input node 121 through a loop that includes closed switch 131, load 110, and closed switch 134. Although the polarity of AC source 120 is reversed in the second state, the direction of the load current remains from DC high node 112 to DC low node 111.

Control module 140 controls the transitions between the states by monitoring the voltages of AC input nodes 121 and 122 to detect when the polarity of AC source 120 changes. Control module 140 may transition from the first state to the second state when the voltage of AC input node 121 decreases below a turn-on threshold voltage. The turn-on threshold voltage may be selected as a voltage level between the turn-on voltage of the body diode and the maximum voltage across switch 131 while it is in the conducting state. The turn-on voltage of the body diode may be approximately −0.7 V, and the maximum voltage across switch 131 may be determined based on a product of the maximum load current and the 'on' resistance of switch 131. Accordingly, the turn-on threshold voltage may be selected as approximately −0.3 V.

Subsequently, control module 140 may transition from the second state to the first state when the voltage of AC input node 121 increases above a turn-off threshold voltage. The turn-off threshold voltage may be selected as approximately 0 V such that the turn-off threshold voltage is crossed when the load current flowing through switch 131 approaches 0 A from a negative value. However, because the 'on' resistance of switch 131 is generally selected to be as small as possible to increase the energy efficiency of synchronous rectifier circuit 100, it may be difficult to accurately detect when the load current reaches 0 A because the detected current and voltage levels are very small. A corresponding error is introduced into the timing of the opening and closing of switches 131 and 133, thereby reducing the energy efficiency of synchronous rectifier circuit 100.

Although the above description of the state transitions applies to switches 131 and 133 and their associated control signals, a similar, complementary analysis applies to switches 132 and 134. The primary difference is that rather than monitoring the voltage of AC input node 121 to determine the state of switches 131 and 133, control module 140 monitors the voltage of complementary AC input node 122 and determines the state of switches 132 and 134.

Figure 2:
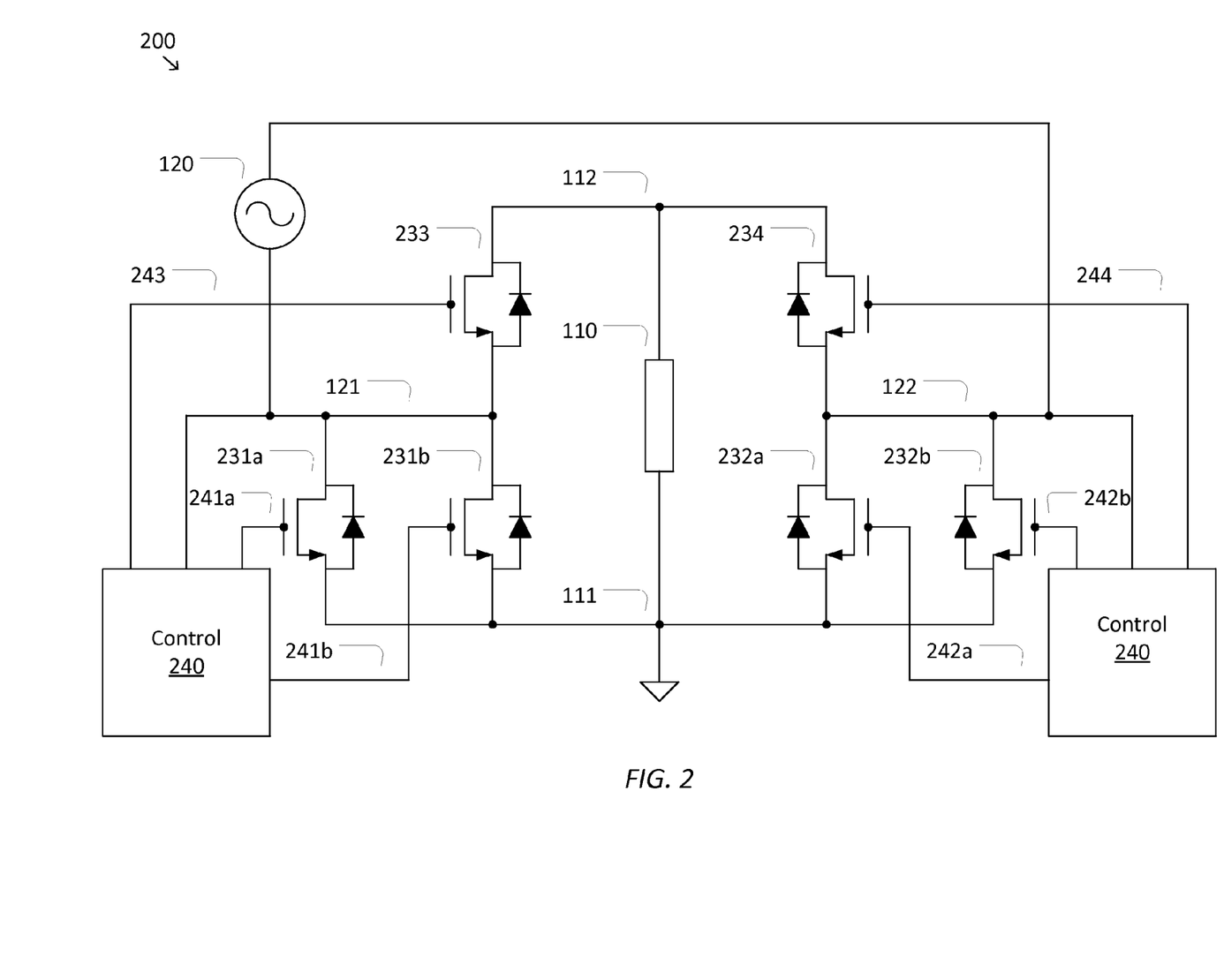
FIG. 2 is a simplified diagram of a synchronous rectifier circuit with enhanced detection of small currents according to some embodiments.

FIG. 2 is a simplified diagram of a synchronous rectifier circuit 200 with enhanced detection of small currents according to some embodiments. Like synchronous rectifier 100, synchronous rectifier circuit 200 includes load 110 coupled between DC low node 111 and DC high node 112, and further includes AC source 120 coupled between AC input node 121 and AC input node 122. However, the switches and control circuitry of synchronous rectifier circuit 200 are modified to enhance the detection of small currents relative to synchronous rectifier circuit 100. As a result, the timing accuracy of opening and closing the switches during an AC waveform may be improved relative to synchronous rectifier circuit 100.

Synchronous rectifier circuit 200 includes switches 231a-234. In general, switches 231a-234 are similar to switches 131-134, as described previously with respect to FIG. 1. Although switches 231a and 231b (and switches 232a and 232b) are arranged in parallel between the same pair of nodes, they are independently controlled. The total 'on' resistance of parallel switches is less than the 'on' resistance of each switch individually. According to some examples, switches 231a and 232a may be configured as low resistance switches having 'on' resistances approximately 5-10 times less than high resistance switches 231b and 232b. The total 'on' resistance of the parallel switches may be approximately the same as the 'on' resistance of switches 233 and 234.

Switches 231a-234 are controlled by a control module 240. Control module 240 is coupled to the gates of switches 231a-234 through control nodes 241a-244. Control module 240 is further coupled to AC input node 121 and AC input node 122 to determine whether the voltage of AC input node 121 is higher than AC input node 122. Control module 240 operates switches 231a-234 in multiple states. In a first state, when the voltage of AC input node 121 is higher than AC input node 122, control module 240 closes (turn on) switches 232a-b and 233 by applying a high voltage to control nodes 242a-b and 243 and opens (turn off) switches 231a-b and 234 by applying a low voltage to control nodes 241a-b and 244. This configuration permits current to flow from AC input node 121 to AC input node 122 through a loop that includes closed switch 233, load 110, and closed switches 232a-b. The direction of the load current (i.e. the current flowing through load 110) is from DC high node 112 to DC low node 111. In a second state, when the voltage of AC input node 122 is higher than AC input node 121, control module 240 closes switches 231a-b and 234 by applying a high voltage to control nodes 241a-b and 244 and opens switches 232a-b and 233 by applying a low voltage to control nodes 242a-b and 243. This configuration permits current to flow from AC input node 122 to AC input node 121 through a loop that includes closed switches 231a-b, load 110, and closed switch 234. Although the polarity of AC source 120 is reversed in the second state, the direction of the load current remains from DC high node 112 to DC low node 111. In a third state, when the voltage of AC input node 122 is higher than AC input node 121 but is approaching a polarity reversal, control module 240 operates switches 231a-234 in an enhanced detection mode by opening switch 231a while switch 231b remains closed. In the enhanced detection mode, the higher resistance of switch 231b relative to switches 231a and 231b in parallel results in greater sensitivity to changes in the load current. Thus, control module 240 is able to more accurately determine when the polarity reversal occurs.

According to some embodiments, control module 240 may transition between the states by monitoring the voltages of AC input node 121 and AC input node 122 to detect when the polarity of AC source 120 changes. In some examples, control module 240 may transition from the first state to the second state when the voltage of AC input node 121 decreases below a turn-on threshold voltage. In some examples, the turn-on threshold voltage is selected as a voltage level between the turn-on voltage of the body diode and the maximum voltage across switch 231a-b while it is in the conducting state. The turn-on voltage of the body diode may be approximately −0.7 V, and the maximum voltage across switches 231a-b may be determined based on a product of the maximum load current during a given cycle of the AC waveform and the total 'on' resistance of parallel switches 231a-b. Accordingly, in some examples, the turn-on threshold voltage is selected as approximately −0.3 V.

Subsequently, control module 240 may transition from the second state to the third state when the voltage of AC input node 121 increases above a first turn-off threshold voltage. In the third state, when low-resistance switch 231a is turned off and high-resistance switch 231b is turned on, synchronous rectifier circuit 200 is in an enhanced detection mode. In enhanced detection mode, even a small current flowing through high-resistance switch 231b results in a suitably large voltage that may be accurately measured by control module 240.

Subsequently, control module 240 may transition from the third state to the first state when the voltage of AC input node 121, now measured using the enhanced detection mode, increases above a second turn-off threshold voltage. The first and second turn-off threshold voltage may be selected as values slightly below 0 V such that the turn-off threshold voltages are crossed when the load current flowing through switches 231a and 231b approaches 0 A from a negative value. According to some examples, the first and second turn-off voltages may be the same. According to some examples, the second turn-off voltage may be higher (i.e., closer to 0 V) than the first turn-off voltage.

Although the above description of the state transitions applies to switches 231a-b and 233 and their associated control signals, a similar, complementary analysis applies to switches 232a-b and 234. The primary difference is that rather than monitoring the voltage of AC input node 121 to determine the state of switches 231a-b and 233, control module 240 monitors the voltage of complementary AC input node 122 and determines the state of switches 232a-b and 234.

Figure 3:
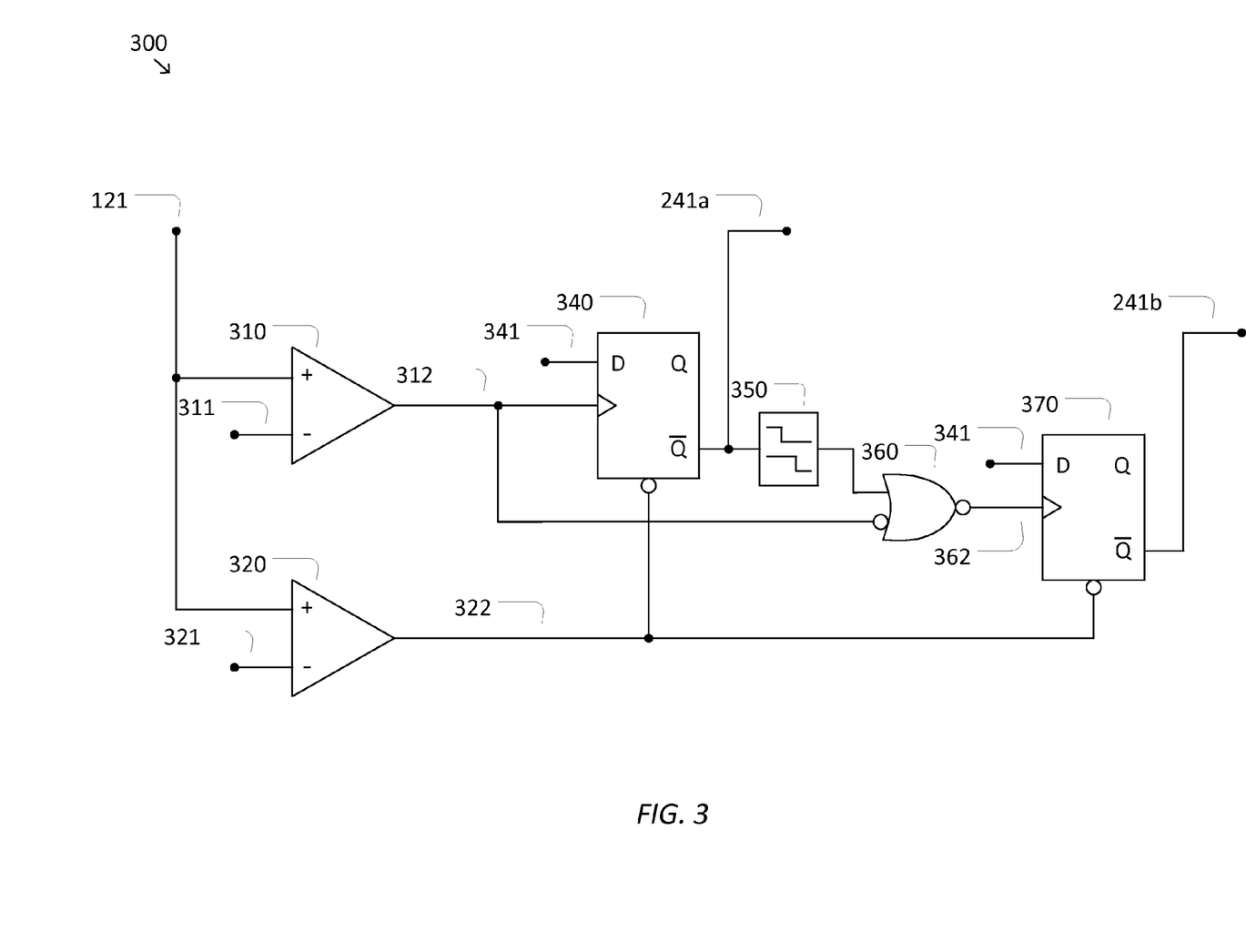
FIG. 3 is a simplified diagram of a control subcircuit for a synchronous rectifier circuit with enhanced detection of small currents according to some embodiments.

FIG. 3 is a simplified diagram of a control subcircuit 300 for a synchronous rectifier circuit with enhanced detection of small currents according to some embodiments. According to some embodiments consistent with FIG. 2, control subcircuit 300 may be used to implement at least a portion of control module 240. Like control module 240, control subcircuit 300 measures a voltage of AC input node 121 and generates output voltages at control nodes 241a and 241b.

Control subcircuit 300 includes a first comparator 310 that compares the voltage of AC input node 121 to a turn-off threshold voltage 311, generating a first turn-off signal 312. Control subcircuit 300 further includes a second comparator 320 that compares the voltage of AC input node 121 to a turn-on threshold voltage 321, generating a turn-on signal 322. Control subcircuit 300 further includes a logic module that includes circuit elements 330-370. The logic module receives signals 312 and 322 from comparators 310 and 320. The logic module performs a state function based on signals 312 and 322 to generate control signals 241a and 241b. The state function includes a first state in which control signals 241a and 241b are low, a second state in which control signals 241a and 241b are high, and a third state in which control signal 241a is low and control signal 241b is high. The state function transitions from the first state to the second state when a high-low transition of comparator 320 is detected, from the second state to the third state when a first low-high transition of comparator 310 is detected, and from the third state to the first state when a second low-high transition comparator 310 is detected.

The first turn-off signal 312 is received by a clock input of a first flip-flop 340. Flip-flop 340 includes a 'D' input coupled to a system supply voltage 341, an inverted 'reset' input coupled to receive turn-on signal 322, and an inverted 'Q' output coupled to control node 241a. As depicted in FIG. 3, the inverted 'reset' input is triggered by a high-low transition of turn-on signal 322, and the clock input is triggered by a low-high transition of first turn-off signal 312. The inverted 'Q' output is further coupled to an input of a high-low delay generator 350. The output of high-low delay generator 350 is coupled to a first input of a NOR gate 360. A second input of NOR gate 360 is coupled to receive and invert first turn-off signal 312. NOR gate 360 generates a second turn-off signal 362, which is transmitted to a clock input of a second flip-flop 370. Flip-flop 370 includes a 'D' input coupled to system supply voltage 341, an inverted 'reset' input coupled to receive turn-on signal 322, and an inverted 'Q' output coupled to control node 241b Like flip-flop 340, the inverted 'reset' input of flip-flop 370 is triggered by a high-low transition of turn-on signal 322. The clock input of flip-flop 370 is triggered by a later-occurring one of a second high-low transition of first turn-off signal 312 and a time-delayed high-low transition of the inverted 'Q' output of the first flip-flop. NOR gate 360 ensures that the earlier-occurring one of the transitions does not trigger the clock input of flip-flop 370.

According to some examples, the state function transitions from the first state to the second state when the voltage of AC input node 121, starting from a high voltage, decreases below turn-on threshold voltage 321. This causes turn-on signal 322 to transition from a high voltage to a low voltage, triggering the inverted 'reset' inputs of flip-flops 340 and 370. After the reset, the inverted 'Q' outputs of flip-flops 340 and 370 output a high voltage, causing control nodes 241a and 241b to transition to a high voltage. When control nodes 241a and 241b transition to a high voltage, switches 231a and 231b (as depicted in FIG. 2) turn on, causing the voltage of AC input node 121 to increase towards the voltage of ground node 111, i.e., 0 V.

According to some examples, the state function transitions from the second state to the third state when the voltage of AC input node 121 increases above the turn-on threshold voltage 321. This causes turn-on signal 322 to transition back from the low voltage to the high voltage. However, the inverted 'Q' outputs of flip-flops 340 and 370 are not modified during the low-high transition of turn-on signal 322. When the voltage of AC input node 121 further increases above the turn-off threshold voltage 311, first turn-off signal 312 transitions from a low voltage to a high voltage, causing the inverted 'Q' output of flip-flop 340 and the voltage of control node 241a to transition from a high voltage to a low voltage. When control node 241a transitions to a low voltage, switch 231a turns off, causing control subcircuit 300 to enter enhanced detection mode.

According to some examples, the state function transitions from the third state to the first state when, upon entering enhanced detection mode, the voltage of AC input node 121 decreases below turn-off threshold voltage 311 and subsequently increases above turn-off threshold voltage 311 again. While the voltage of AC input node 121 is below turn-off threshold voltage 311, the output of high-low delay generator 350 transitions to a low voltage. Therefore, when the voltage of AC input node 121 increases above turn-off threshold voltage 311, second turn-off signal 362 transitions from a low voltage to a high voltage, resulting in the inverted 'Q' output of flip-flop 370 transitioning from a high voltage to a low voltage. This high-low transition turns off switch 231b, allowing the voltage of AC input node 121 to return to the high voltage and begin a next cycle of the AC waveform.

As discussed above and further emphasized here, FIGS. 1-3 are merely examples which should not unduly limit the scope of the claims. One of ordinary skill in the art would recognize many variations, alternatives, and modifications. According to some embodiments, synchronous rectifier circuit 200 may be configured as a half-bridge rectifier, three-phase rectifier, voltage-multiplying rectifier, and/or the like rather than a full-bridge rectifier as depicted in FIG. 2. Configuring synchronous rectifier circuit 200 to perform another type of rectification may be accomplished by modifying, removing, and/or adding various components within the circuit in a manner that will be apparent to one skilled in the art. According to some embodiments, rather than entering enhanced detection mode by turning off one of a pair of parallel switches, such as switch 241a and/or 242a, enhanced detection may be achieved by increasing the resistance of a single switch. In some examples, increasing the resistance may be achieved by reducing the gate voltage applied to an FET associated with the switch. In furtherance of such embodiments, control module 240 may be adapted to apply a low control voltage to turn off the single switch, a high control voltage to strongly turn on the switch, and a medium control voltage to weakly turn on the switch during enhanced detection mode. In some examples, the gate voltage applied to the FET may be modulated in a continuous manner in during the enhanced detection mode, thereby allowing the resistance of the switch to be modulated in a manner that optimally balances the desire for energy efficiency (low resistance) and enhanced detection (high resistance) during a polarization reversal of the AC waveform.

According to some embodiments, various components depicted in control subcircuit 300 may be added, removed, modified and/or rearranged. According to some embodiments, rather than comparing the voltage of AC input node 121 to a single turn-off threshold voltage 311 using comparator 310, control subcircuit 300 may compare the voltage of AC input node 121 to a pair of turn-off threshold voltages using a pair of comparators. Each of the turn-off threshold voltages may independently determine a separate one of the control voltages 241a and 241b. Although the embodiment of control subcircuit 300 depicted in FIG. 3 advantageously reduces the number of comparators in the subcircuit to one turn-on comparator 320 and one turn-off comparator 310, substituting turn-off comparator 310 with a pair of comparators may provide for greater control over the threshold values and detection accuracy even though the number of comparators in the subcircuit is increased to three. According to some examples, a single comparator may be used to compare the voltage of AC input node 121 to multiple threshold voltages by dynamically changing the threshold voltage input of the single comparator during operation.

Figure 4:
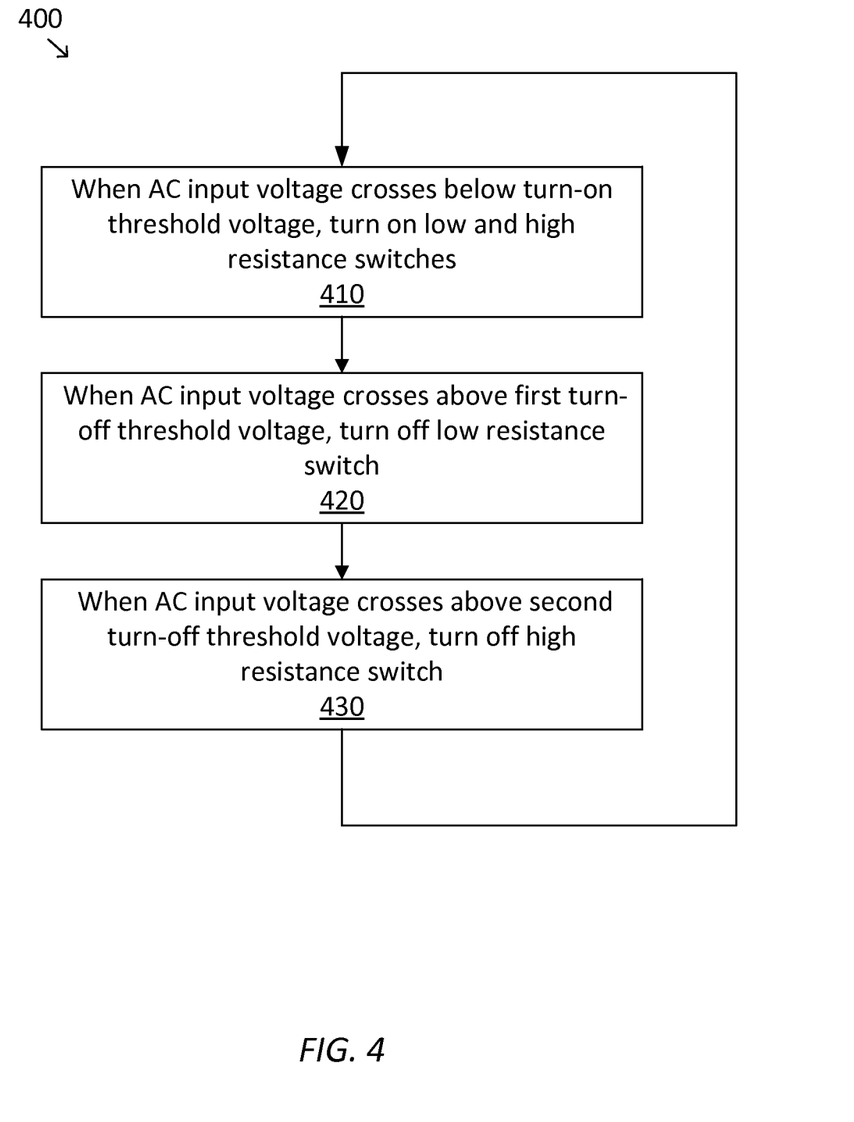
FIG. 4 is a simplified diagram of a method of synchronous rectification with enhanced detection of small currents according to some examples.

FIG. 4 is a simplified diagram of a method 400 of synchronous rectification with enhanced detection of small currents according to some examples. According to some embodiments, method 400 may be performed using a synchronous rectifier circuit configured for enhanced detection of small currents, such as synchronous rectifier circuit 200.

Figure 5:
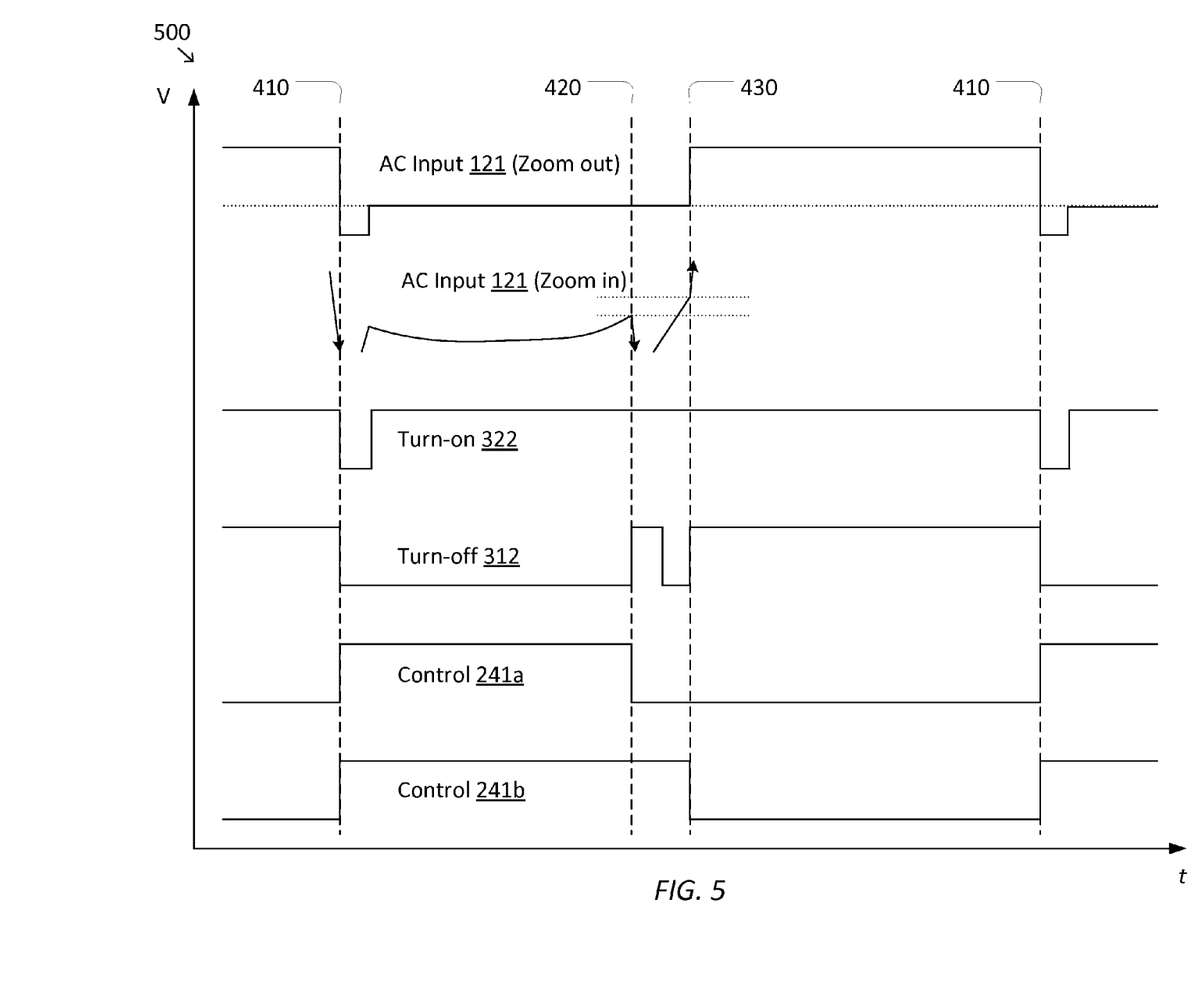
FIG. 5 is a simplified diagram showing time-varying voltage levels at various nodes during various stages of the method of synchronous rectification according to some examples.

Performing method 400 produces time-varying voltage levels at various nodes of the synchronous rectifier circuit. FIG. 5 is a simplified diagram showing time-varying voltage levels 500 at various nodes during various stages of the method of synchronous rectification according to some examples. FIG. 5 depicts traces of voltage versus time at the following nodes of the synchronous rectifier circuit: an AC input node 121; a turn-on signal 322; a turn-off signal 312; a first control node 241a; and a second control node 241b. The AC input node is one of a pair of nodes carrying an AC signal. During a cycle of the AC waveform, two or more polarity reversals occur in which the voltage of the AC input node transitions from high to low and/or low to high relative to the complementary node. For simplicity, the behavior associated with one of the pair of input nodes is described in detail, although it is to be understood that a similar description applies to the complementary input node. It is emphasized that the traces depicted in FIG. 5 are merely illustrative and that the actual traces may vary significantly from the depicted traces in some embodiments.

Referring to FIGS. 4 and 5, at a process 410, low and high resistance switches are turned on when the voltage of the AC input node crosses below a turn-on threshold voltage. The crossing corresponds to a high to low polarity reversal of the AC waveform. According to some embodiments, the determination of whether the voltage of the AC input node is above or below the turn-on threshold voltage may be performed using a comparator. The output of the comparator may be received by a logic module. When the voltage of the AC input node crosses below the turn-on threshold voltage, the logic module may generate control signals that turn on the low and high resistance switches. According to some embodiments, the logic module may be configured to perform a state function to determine the control signals, the state function having been described previously with respect to FIG. 3. According to some embodiments, process 410 may be performed during a transition of the state function from the first state to the second state. In some embodiments, the low and high resistance switches may correspond to switches 231a and 232b, respectively, as described previously with respect to FIG. 2.

According to some examples, the high and low resistance switches may include field effect transistors (FETs), each FET having a gate, source and drain. In some examples, the FETs may be n-channel FETs (NFETs). The NFETs are turned on when their gate voltage is higher than their source voltage by at least a threshold voltage, otherwise, they are turned off. According to some embodiments, the FET associated with the low resistance switch may be wider than the FET associated with the high resistance switch, thereby having a lower 'on' resistance. In some example, the low resistance FET is wider than the high resistance FET by a factor of 5-10. According to some examples, the turn-on threshold voltage may be a value less than 0 V and greater than a typical diode turn-on voltage, such as −0.7 V. In some examples, the turn-on threshold voltage may be approximately −0.3 V.

In some examples, a delay may exist between the time when the AC input node crosses below the turn-on threshold voltage and the time when the low and high resistance switches are turned on. During the delay period, the switches remain turned off, and the voltage of the AC input node continues to decrease. The delay period is depicted in the zoomed out trace of AC input node 121, where the voltage level dips below the turn-on threshold voltage (represented by the horizontal dotted line) at the onset of process 410. Subsequently, when the delay period ends and the low and high resistance switches are turned on, the AC input node is coupled to a ground node through the turned on switches, causing the voltage of the AC input node to increase toward the ground voltage. The voltage of the AC input node stops increasing when it reaches a level slightly less than the ground voltage, the level being determined based on the product of the load current and the total 'on' resistance of the parallel switches. The voltage of the AC input node may remain slightly below the ground voltage until the next low to high polarity switch of the AC waveform.

At a process 420, the low resistance switch is turned off when the voltage of the AC input node crosses above a first turn-off threshold voltage. The crossing is depicted in the zoomed in trace of AC input 121, where the voltage level reaches the first turn-off threshold voltage (represented by the lower horizontal dotted line) at the onset of process 420. The crossing corresponds to a low to high polarity switch of the AC waveform. According to some embodiments, the determination of whether the voltage of the AC input node is above or below the first turn-off threshold voltage may be performed using a comparator. The output of the comparator may be received by the logic module. When the voltage of the AC input node crosses above the first turn-off threshold voltage, the logic module may generate a control signal that turns off the low resistance switch. According to some embodiments in which the logic module is configured to perform the state function as described in FIG. 3, process 420 may be performed during a transition of the state function from the second state to the third state. According to some embodiments, turning off the low resistance switch results in the synchronous rectifier circuit entering an enhanced detection mode.

In some examples, turning off the low resistance switch causes the load current that previously flowed through the low and high resistance switches in parallel to flow primarily through the high resistance switch. As a result, the load current flows through a higher resistance path and the voltage of the AC input node decreases (i.e., becomes more negative relative to the ground node). Also, because the load current flows through a higher resistance path, the voltage of the AC input node becomes more sensitive to changes in the load current. Accordingly, as the low to high polarity switch of the AC waveform proceeds and the load current reverses direction, the synchronous rectifier circuit is able to accurately detect the load current and control the switches in a timely manner. The increase in sensitivity is depicted on the zoomed in trace corresponding to AC input node 121 in FIG. 5 where the slope of the voltage of AC input node as it increases towards the turn-off threshold voltages after process 420 is steeper than before process 420.

At a process 430, the high resistance switch is turned off when the voltage of the AC input node crosses above a second turn-off threshold voltage. The crossing is depicted in the zoomed in trace of AC input 121, where the voltage level reaches the second turn-off threshold voltage (represented by the upper horizontal dotted line) at the onset of process 430. According to some embodiments, the determination of whether the voltage of the AC input node is above or below the second turn-off threshold voltage may be performed using a comparator. In some examples consistent with FIG. 3, the first and second turn-off voltages may be the same voltage, and the comparator may be the same comparator. In some examples, the first and second turn-off voltages may be different, and separate comparators may be used for processes 420 and 430. The output of the comparator may be received by the logic module. When the voltage of the AC input node crosses above the second turn-off threshold voltage, the logic module may generate a control signal that turns off the high resistance switch. According to some embodiments in which the logic module is configured to perform the state function as described in FIG. 3, process 430 may be performed during a transition of the state function from the third state to the first state. Turning off the high resistance switch decouples the AC input node from the ground node, thereby allowing the voltage of AC input node to return to a high voltage and begin a next cycle of the AC waveform.

As discussed above and further emphasized here, FIGS. 4 and 5 are merely examples which should not unduly limit the scope of the claims. One of ordinary skill in the art would recognize many variations, alternatives, and modifications. According to some embodiments, one or more processes of method 400 may be performed concurrently and/or in a different order than depicted. According to some embodiments, the polarity of certain nodes may be reversed relative to the descriptions provided without disrupting the underlying processes of method 400. That is, in some embodiments, a 'high' voltage may be substituted with a 'low' voltage and vice versa. Further, switches are merely labeled as 'high' and 'low' resistance for clarity, and in some examples, the actual resistance value of the low resistance switch may be comparable to or greater than the high resistance switch.

Some examples of controllers, such as control module 240 may include non-transient, tangible, machine readable media that include executable code that when run by one or more processors may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An synchronous rectifier circuit comprising:
    a direct current (DC) load coupled between a DC output node and a ground node;
    an alternating current (AC) source applying an AC waveform to an AC input node;
    an upper switch coupled between the DC output node and the AC input node; and
    a lower switch coupled between the AC input node and the ground node;
    wherein the synchronous rectifier circuit is configured to operate in multiple states based on a load current of the DC load, the multiple states including:
        a first state, wherein in the first state, the upper switch is turned on and the lower switch is turned off;
        a second state, wherein in the second state, the upper switch is turned off and the lower switch is turned on; and
        a third state, wherein in the third state, the upper switch is turned off and the lower switch is operated in an enhanced detection mode, wherein a voltage of the AC input node is more sensitive to changes in the load current in the third state than in the second state;
    wherein the synchronous rectifier circuit transitions from the first state to the second state when the voltage of the AC input node decreases below a first threshold voltage, from the second state to the third state when the voltage of the AC input node increases above a second threshold voltage, and from the third state to the first state when the voltage of the AC input node increases above a third threshold voltage.

2. The synchronous rectifier circuit of claim 1, wherein the lower switch includes a high resistance field effect transistor (FET) and a low resistance FET arranged in parallel, the high resistance FET having a smaller width than the low resistance FET.

3. The synchronous rectifier circuit of claim 2, wherein the high resistance FET has a smaller width than the low resistance FET by a factor of between 5 and 10.

4. The synchronous rectifier circuit of claim 2, wherein:
    when the lower switch is turned on, the low and high resistance FETs are in a conductive state;
    when the lower switch is turned off, the low and high resistance FETs are in a non-conductive state; and
    when the lower switch is operated in the enhanced detection mode, the low resistance FET is in a non-conductive state and the high resistance FET is in a conductive state.

5. The synchronous rectifier circuit of claim 2, wherein the upper switch includes an FET having a resistance that matches a combined resistance of the high and low resistance FETs of the lower switch.

6. The synchronous rectifier circuit of claim 5, wherein the FETs are n-type FETs.

7. The synchronous rectifier circuit of claim 1, wherein the first threshold voltage is −0.3 V.

8. The synchronous rectifier circuit of claim 1, wherein the second and third threshold voltages are the same.

9. The synchronous rectifier circuit of claim 1, wherein the DC load includes smoothing filters.

10. The synchronous rectifier circuit of claim 1, further comprising complementary upper and lower switches coupled to an input node of opposite polarity relative to the AC input node, the complementary upper and lower switches arranged in relation to the upper and lower switches so as to form a full-bridge rectifier circuit.

11. A control circuit for a synchronous rectifier, the control circuit comprising:
    a logic module configured to transmit one or more control signals to operate one or more switches of the synchronous rectifier;
    a first comparator configured to determine whether a voltage of an AC input node is above or below a turn-on threshold voltage;

a second comparator configured to determine whether the voltage of the AC input node is above or below a turn-off threshold voltage; and a logic module configured to detect low-high and high-low transitions of the first and second comparators and transmit one or more control signals to operate one or more switches of the synchronous rectifier;

wherein the logic module determines the one or more control signals based on a state function, the state function including:

a first state, wherein in the first state, the one or more switches are turned off;

a second state, wherein in the second state, the one or more switches are turned on; and a third state, wherein in the third state, the one or more switches are operated in an enhanced detection mode;

wherein the state function transitions from the first state to the second state when a high-low transition of the first comparator is detected, from the second state to the third state when a first low-high transition of the second comparator is detected, and from the third state to the first state when a second low-high transition of the second comparator is detected.

12. The control circuit of claim 11, wherein the one or more control signals include a first control signal to operate a low resistance FET and a second control signal to operate a high resistance FET, the low and high resistance FETs being arranged in parallel and the high resistance FET having a smaller width than the low resistance FET.

13. The control circuit of claim 12, wherein the FETs are n-type FETs.

14. The control circuit of claim 12, wherein the high resistance FET has a smaller width than the low resistance FET by a factor of between 5 and 10.

15. The control circuit of claim 12,
when the one or more switches are turned on, the first and second control signals operate the low and high resistance FETs in a conductive state;
when the one or more switches are turned off, the first and second control signals operate the low and high resistance FETs in a non-conductive state; and
when the one or more switches are operated in the enhanced detection mode, the first and second control signals operate the low resistance FET in a non-conductive state and the high resistance FET in a conductive state.

16. The control circuit of claim 14, wherein the logic module includes a first flip-flop, the first flip-flop including:
a D input coupled to a high voltage rail;
an inverted Q output that corresponds to the first control signal;
a reset input triggered by a first high-low transition of the second comparator; and
a clock input triggered by a low-high transition of the second comparator.

17. The control circuit of claim 15, wherein the logic module further includes a second flip-flop, the second flip-flop including:
a D input coupled to a high voltage rail;
an inverted Q output that correspond to the second control signal;
a reset input triggered by a high-low transition of the first comparator; and
a clock input triggered by a later-occurring one of a second high-low transition of the second comparator and a time-delayed high-low transition of the inverted Q output of the first flip-flop.

18. The control circuit of claim 11, further comprising complementary first and second comparators configured to detect a voltage of an input node of opposite polarity relative to the AC input node, and a complementary logic module configured to detect low-high and high-low transitions of the complementary first and second comparators, the complementary first and second comparators and complementary logic module being arranged in relation to the first and second comparators and logic module so as to form a full-bridge rectifier circuit.

19. A method for operating a synchronous rectifier, the method comprising:
detecting when an AC input voltage crosses below a turn-on threshold voltage;
when the AC input voltage crosses below the turn-on threshold voltage, turning on one or more switches of the synchronous rectifier;
detecting when the AC input voltage crosses above a first turn-off threshold voltage;
when the AC input voltage crosses above the first turn-off threshold voltage, operating the one or more switches in an enhanced detection mode;
detecting when the AC input voltage crosses above a second turn-off threshold voltage; and
when the AC input voltage crosses above the second turn-off threshold voltage, turning off the one or more switches.

20. The method of claim 19, wherein the one or more switches include a low resistance switch and a high resistance switch, and wherein:
when the one or more switches are turned on, the low and high resistance switches are in a conductive state;
when the one or more switches are turned off, the low and high resistance switches are in a non-conductive state; and
when the one or more switches are operated in the enhanced detection mode, the low resistance switch is in a non-conductive state and the high resistance switch is in a conductive state.

* * * * *